(12) United States Patent
Comer et al.

(10) Patent No.: US 8,670,001 B2
(45) Date of Patent: Mar. 11, 2014

(54) SYSTEM AND METHOD FOR CONVERTING A FISH-EYE IMAGE INTO A RECTILINEAR IMAGE

(75) Inventors: Robert P. Comer, Concord, MA (US); Anurag Sharma, South Grafton, MA (US)

(73) Assignee: The MathWorks, Inc., Natick, MA (US)

( * ) Notice: Subject to any disclaimer, the term of this patent is extended or adjusted under 35 U.S.C. 154(b) by 1653 days.

(21) Appl. No.: 11/565,436

(22) Filed: Nov. 30, 2006

(65) Prior Publication Data

US 2008/0129723 A1    Jun. 5, 2008

(51) Int. Cl.
*G06T 15/00* (2011.01)

(52) U.S. Cl.
USPC .......... 345/619; 345/419; 345/653; 345/664; 345/679; 345/647

(58) Field of Classification Search
USPC ................ 345/419, 653, 679, 619, 664, 647
See application file for complete search history.

(56) References Cited

U.S. PATENT DOCUMENTS

| | | | |
|---|---|---|---|
| 4,908,874 A | 3/1990 | Gabriel | |
| 5,067,019 A | 11/1991 | Juday et al. | |
| 5,130,794 A | 7/1992 | Ritchey | |
| 5,185,667 A | 2/1993 | Zimmermann et al. | |
| 5,291,587 A * | 3/1994 | Kodosky et al. | 703/2 |
| 5,359,363 A | 10/1994 | Kuban | |
| 5,384,588 A | 1/1995 | Martin et al. | |
| 5,684,937 A | 11/1997 | Oxaal | |
| 5,877,801 A | 3/1999 | Martin et al. | |
| RE36,207 E | 5/1999 | Zimmermann et al. | |
| 6,243,099 B1 | 6/2001 | Oxaal | |
| 6,256,061 B1 | 7/2001 | Martin et al. | |
| 6,603,502 B2 * | 8/2003 | Martin et al. | 348/36 |
| 6,788,333 B1 * | 9/2004 | Uyttendaele et al. | 348/36 |
| 6,795,113 B1 | 9/2004 | Jackson et al. | |
| 7,529,424 B2 * | 5/2009 | Ahiska | 382/275 |
| 2002/0190987 A1 * | 12/2002 | Travers et al. | 345/427 |
| 2003/0011597 A1 * | 1/2003 | Oizumi | 345/427 |
| 2005/0105822 A1 * | 5/2005 | Narita | 382/275 |

OTHER PUBLICATIONS

Atkins, Bob. (http://www.bobatkins.com/photography/technical/field_of_view.html) Jan. 18, 2006.*
Zimmermann, Steve et al., "An Electronic Pan/Tilt/Zoom Camera System", SPIE vol. 1963 Airborne Reconnaissance XVI, Jul. 1992, 10 pgs.

(Continued)

*Primary Examiner* — Michelle L Sams
(74) *Attorney, Agent, or Firm* — Cesari and McKenna, LLP; Michael R. Reinemann

(57) ABSTRACT

A system and method are disclosed for converting a region of a Fish-Eye or other wide-angle image into a rectilinear image. According to an illustrative embodiment of the present disclosure, a Fish-Eye to rectilinear image conversion block is defined for use in a block diagram of a diagrammatic programming environment. The Fish-Eye to rectilinear image conversion block may use any of a variety of models for Fish-Eye systems, and thus is "model-independent." Further, intuitive zoom, pan, tilt, and attitude adjustment parameters may be used with the image conversion block, to allow control of the conversion by users lacking advanced understanding of optics.

56 Claims, 11 Drawing Sheets

(56) References Cited

OTHER PUBLICATIONS

"Manual of Photogrammetry, Fifth Edition", American Society for Photogrammetry and Remote Sensing, The Imaging and Geospatial Information Society, 2004, pp. 242-243.

"Halocam: A New Kind of Camera", Grandeye Limited, 2004, pp. 37-42.

Turkowski, Ken, "Making Environment Maps from Fishey Photographs (Using Fish Eye Images in an Ipix-Free Manner)", www.worldserver.com/turk/quicktimevr/fisheye.htm, Jul. 4, 1999, pp. 1-8.

* cited by examiner

SYSTEM AND METHOD FOR CONVERTING A FISH-EYE IMAGE INTO A RECTILINEAR IMAGE

BACKGROUND

1. Technical Field

The present disclosure related generally to conversion of wide-angle images into rectilinear images.

2. Background Information

A diagrammatic programming language is one in which visual expressions, and the interconnections among visual expressions, are used to control program functions. Rather than simply enter text commands, a user manipulates the visual expressions in an interactive manner, according to a program structure and grammar. Many diagrammatic programming languages are structured according to a block diagram, where a set of nodes, called blocks, are interconnected by lines that represents signals. Blocks are functional entities that perform mathematical operations, transformations, or both, on data and information passed through the block diagram. Signals are streams of data and information that that flow between various blocks. Signals have particular data types, and may also include timing and control information related to the blocks.

One language that employs a block diagram, with blocks interconnected by signals, is the Simulink® technical computing environment available from The Mathworks, Inc. of Natick, Mass. The Simulink® environment allows a user to create a dynamic system by constructing a block diagram from a plurality of blocks provided in a pre-defined library, or specially defined by a user. Each block produces outputs either continuously (i.e. a continuous block) or at specific points in time (i.e. a discrete block). The signals transmit the outputs to other blocks to indicate interactions between the blocks.

With the Simulink® environment, a user may simulate (model) the behavior of a system in response to certain input and control data. Such a simulation may be performed in the diagrammatic programming environment itself, using an interpretive process. Alternately, a user may convert the block diagram to executable code. Automatic code generation is a process where text-based program code (such as C or C++ code) is automatically produced from a diagrammatic representation. The text-based program code is then compiled to produce an executable file. In this manner, the functionality specified in the block diagram may be exported beyond the diagrammatic programming environment to computers that lack the ability to interpret block diagrams. In yet another alternative, the block diagram may be translated to code specific for an embedded hardware target, such as a digital signal processing (DSP) chip, and this code used with the embedded hardware target to execute the functionality of the block diagram. In this manner, a block diagram may be used in rapid prototyping and testing applications, where hardware devices configured in a particular manner are required.

One area where the above described diagrammatic programming techniques may be employed, is in the field of image manipulation. Historically, most image manipulation was performed by optical lenses attached to cameras or other optical sensors (collectively image acquisition devices). For example, if magnification of an image was desired, an optical zoom having a mechanical assembly of lenses was employed with an image acquisition device. Similarly, if a different field of view (i.e. an angle of view defining a region of the environment captured) was desired, a lens adapted to capture that particular field of view was physically mounted to the image acquisition device.

Currently, it is often more economical to perform image manipulation in software, rather than with optics, due to the availability of relatively inexpensive computing resources. Further, software allows for many types of advanced image manipulation that are impossible using only optical lenses. Accordingly, it is now common to acquire images in a first format and then extensively process the images to create images of a second format that is more desirable to a user.

One format in which an image may be captured is the wide-angle format. A wide-angle lens is a lens configured with a decreased focal length, such that it captures a wider field of view than more conventional lenses. A wider field of view allows more of an environment to be captured in a given image, which may be beneficial for many applications. For example, in a security application where camera coverage of a given room is desired, use of a wide-angle lens may allow the coverage to be achieved with fewer cameras.

Yet, to achieve a wider field of view, a wide-angle lens generally must introduce perspective distortion into the image, causing the portion of the image that is located at the center to appear abnormally enlarged, and portions of the image towards the edges to appear abnormally compressed. Such distortion gives wide-angle images a distinctive convex appearance that is distracting to many viewers.

One particular type of wide-angle image is a Fish-Eye image, where the field of view has been extended to the extreme. A Fish-Eye image typically encompasses about a 180-degree (i.e., hemispherical) field of view, though some Fish-Eye images encompass a field of view that is somewhat greater or lesser in angle. Indeed, some known specialty Fish-Eye lenses produce images with a 220-degree field of view, while other known Fish-Eye lenses produce images with fields of view of only 150-degrees. A Fish-Eye image achieves its extremely wide field of view at the trade off of perspective distortion, which is typically severe. Thus, Fish-Eye images are typically characterized as curvilinear, where straight lines in the environment are represented as distinctly curved lines in the image. Despite this distortion, the benefits of Fish-Eye images make them desirable in a variety application. Fish-Eye lenses and the images they produce are particularly suited for a variety of applications in the fields of security, automotive, virtual reality, virtual tours, and scientific research.

Sometimes, it may be desirable to manipulate a Fish-Eye or other wide-angle image to remove some of the perspective distortion in a region of the image, and create a rectilinear image from the region. A rectilinear image is one where vertical, horizontal, and diagonal lines in the environment are displayed as substantially straight lines in the image. In order to represent these lines as substantially straight, a rectilinear image is restricted to a significantly smaller field of view than a Fish-Eye image. Yet, since rectilinear images are generally perceived by viewers to be "normal" (i.e. "correct") images, they are widely used in photography, cinema, and other applications. Accordingly, conversion of a region of a Fish-Eye or other wide-angle image to a rectilinear image is often desirable. Such a conversion is sometimes referred to as dewarping the image, though the term may have other connotations in different contexts.

Several techniques are known for converting a Fish-Eye or other wide-angle image to a rectilinear image, yet these known techniques have shortcomings. In particular, they typically lack an intuitive way to specify the particular region of the Fish-Eye or other wide-angle image from which to construct the rectilinear image. Often, prior techniques require one to specify the size and orientation of such a region in terms of a variety of obscure angles and lengths that have little meaning to those outside of the field of optics. Accordingly, such prior techniques are generally unsuitable for users that have general computer training, but lack special knowledge of optics.

SUMMARY

Briefly, one embodiment of the present disclosure is directed to a system and method for converting a portion of a Fish-Eye or other wide-angle image into a rectilinear image. According to an illustrative embodiment of the present disclosure a Fish-Eye to rectilinear image conversion component, such as a block, is defined for use in a block diagram of a diagrammatic programming environment. The Fish-Eye to rectilinear image conversion block is coupled via signals to a Fish-Eye image acquisition device or data file storing a Fish-Eye image. The image conversion block is further coupled to a display device or an output data file by additional signals. Using an input device, a user may configure the Fish-Eye to rectilinear image conversion block to perform the desired conversion.

The Fish-Eye to rectilinear image conversion block preferably implements a series of steps to perform the conversion by mapping pixel locations in a rectilinear image to pixel locations in a Fish-Eye (or other wide-angle) image. First, a pixel location (x,y) is selected in the rectilinear image. The pixel location is translated into a mathematical representation of the rectilinear system, which is based on several parameters including dimensions of the rectilinear system, and in some embodiments a zoom factor. The zoom factor is preferably specified by a user with an intuitive representation, such as with 1x, 2x, 3x factors, which are then translated into quantities used with the mathematical model. Then, the pixel location is translated to a 3-D position relative to the rectilinear image. A series of 3-D rotations are performed on the 3-D position, including pan, tilt, and attitude adjustment rotations. These rotation are performed in response to the specification of intuitive pan, tilt, and attitude adjustment parameters, allowing users without advanced optics knowledge the ability to manipulate the conversion. The now-rotated 3-D position is translated to a 3-D position relative to the Fish-Eye image. The 3-D position relative to the Fish-Eye image is used with a mathematical representation of a Fish-Eye system to generate a specific pixel location in the Fish-Eye image. In this manner, the pixel location in the rectilinear image is mapped to a pixel location in the Fish-Eye image. Thereafter, attributes of the pixel, or several nearby pixels, in the Fish-Eye image are used to set attributes of the corresponding pixel in the rectilinear image. By repeating this series of step, attributes of all pixels in the rectilinear image are constructed.

In some embodiments of the present disclosure, a variety of different mathematical models for Fish-Eye systems may be employed in the mathematical representation of the Fish-Eye system, such that the conversion process may be characterized as "model-independent." In this manner, the system may adapt the conversion to meet particular design requirements.

Further, in some embodiments of the present disclosure, a series of rotation matrices are employed to allow a user to specify pan, tilt, and attitude adjustment parameters in an intuitive manner. A user may first specify whether the Fish-Eye image acquisition device is oriented in an approximately horizontal or an approximately vertical manner, and the rotation matrices may be adapted to these differing orientations.

If the image acquisition device is oriented approximately horizontally, first and second adjustment parameters may be used to generate adjustment matrices that bring the Fish-Eye image into substantially true horizontal alignment. The adjustment matrices perform a "swing" about the optical access so that horizontal lines in the image appear as horizontal, while also bringing the optical axis itself into horizontal alignment. Then, in response to a pan parameter, a rotation matrix rotates the Fish-Eye image about a vertical axis to select a portion of the image. Finally, in response to a tilt parameter, an additional rotation matrix rotates the Fish-Eye image about a horizontal axis to further specify the portion of the image to be converted to a rectilinear image.

Similarly, if the device is oriented approximately vertically (which for purposes of discussion herein is assumed to be vertically "down-looking"), first and second adjustment parameters may be used to generate adjustment matrices that bring the Fish-Eye image into alignment substantially with true nadir, i.e. directly downward. Then, in response to a pan parameter, a rotation matrix rotates the Fish-Eye image about a vertical axis to select a portion of the image. Finally, in response to a tilt parameter, an additional rotation matrix rotates the Fish-Eye image about a horizontal axis to further specify the portion of the image to be converted to a rectilinear image.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
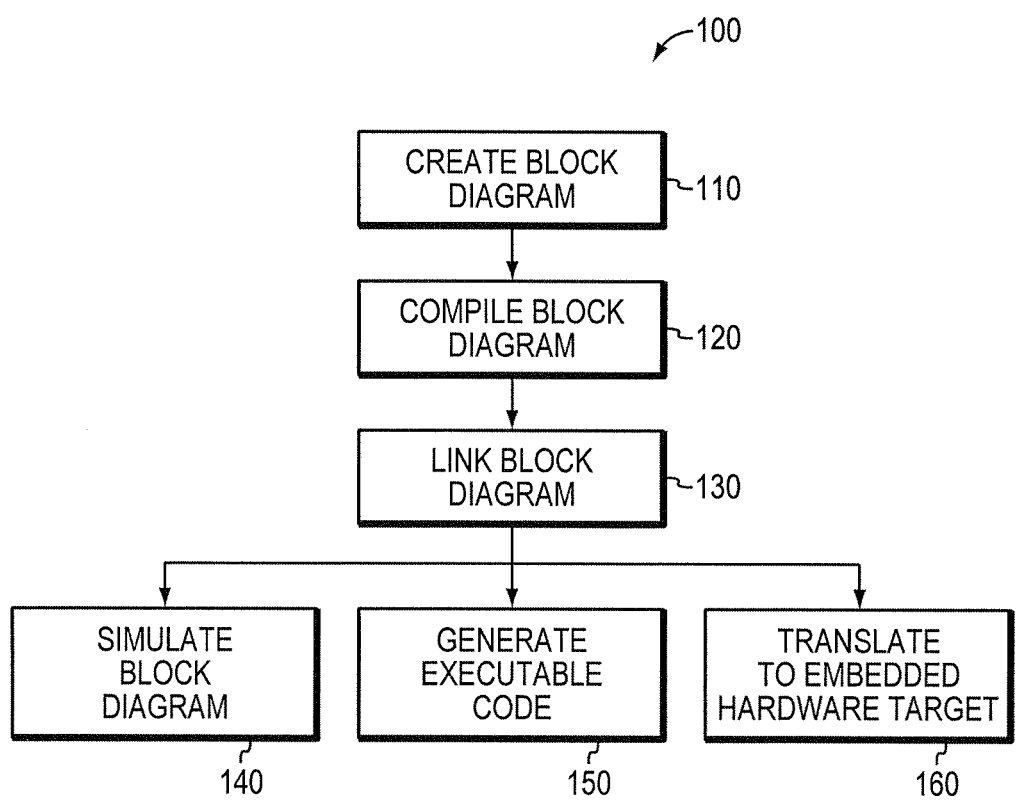
FIG. 1 is a flow diagram illustrating one possible series of steps for implementing a dynamic system from a block diagram of a diagrammatic programming language.

FIG. 1 is a flow diagram 100 illustrating one possible series of steps for implementing a system from a block diagram of a diagrammatic programming language. In one embodiment, the diagrammatic programming language is the Simulink® technical computing environment available from The Mathworks, Inc. of Natick, Mass. Yet, it should be remembered that the teachings described herein may alternately be employed with other well known diagrammatic programming languages, for example LabVIEW available from National Instruments Corp. Further, it should be remembered that, some or all of the teachings described herein may be employed with a text-based programming environment, for example, the MATLAB® technical computing environment also available from The MathWorks, Inc., C, or Java, and accordingly the teachings below should not be considered as limited to diagrammatic programming environments. Indeed, a combined diagrammatic and text-based environment may be employed with the some or all of the teachings described herein to achieve advantages of both paradigms. In step 110, a user creates a block diagram of a system using a program interface, such as a graphical user interface (GUI). Each block of the block diagram specifies certain functionality, which may be configured by user selection of a variety of options and parameters associated with the block. The blocks are interconnected by lines that represent signals. Signals indicate the data dependencies and interactions between blocks, as well as communicate attributes of the blocks among the blocks. Such attributes, as discussed below, may affect the function of neighboring blocks.

Once a block diagram has been constructed, it is compiled at step 120. During compilation, the integrity and validity of the interconnections between the blocks is tested. Then, a set of data structures needed to evaluate the blocks is generated. Further, the attributes of the blocks are examined in a process that "ripples through" the block diagram, following the signals. Some blocks may be configured to adapt their function in response to the attributes of interconnected blocks, akin to the concept of polymorphism in object-oriented programming languages, and accordingly such adaptations are computed.

Subsequently, at step 130, the block diagram is linked, a step where memory resources are allocated and certain execution lists are generated. Further, blocks are initialized to particular starting states.

Thereafter, the block diagram may be simulated, translated to executable code, or translated to code used with an embedded hardware target, depending upon a user's preference. In the first alternative, at step 140, an interpretive process is employed to simulate the functionality of the block diagram within the diagrammatic programming environment. In this manner, the functionality of the block diagram may be modeled simply and rapidly. In the second alternative, at step 150, the block diagram is translated into executable text-based program code (such as C or C++ code). The executable text-based code is thereafter compiled to produce an executable file embodying the functionality of the block diagram. The executable file is environment independent, and may readily be transferred to other systems, such as other stand alone computing systems, distributed computing systems or embedded computing systems, which may, or may not, support a diagrammatic programming environment. In the third alternative, at step 160, the block diagram is used to configure an embedded hardware target, for example a digital signal processing (DSP) chip, a Field-Programmable Gate Array (FPGA), a Programmable Logic Device (PLD), an analog logic circuit, or other hardware device. In this manner, an embedded hardware target may implement the functionality of the block diagram. Such embedded hardware targets are often desirable in a variety of real-time applications, including testing, research, and prototyping applications.

Figure 2:
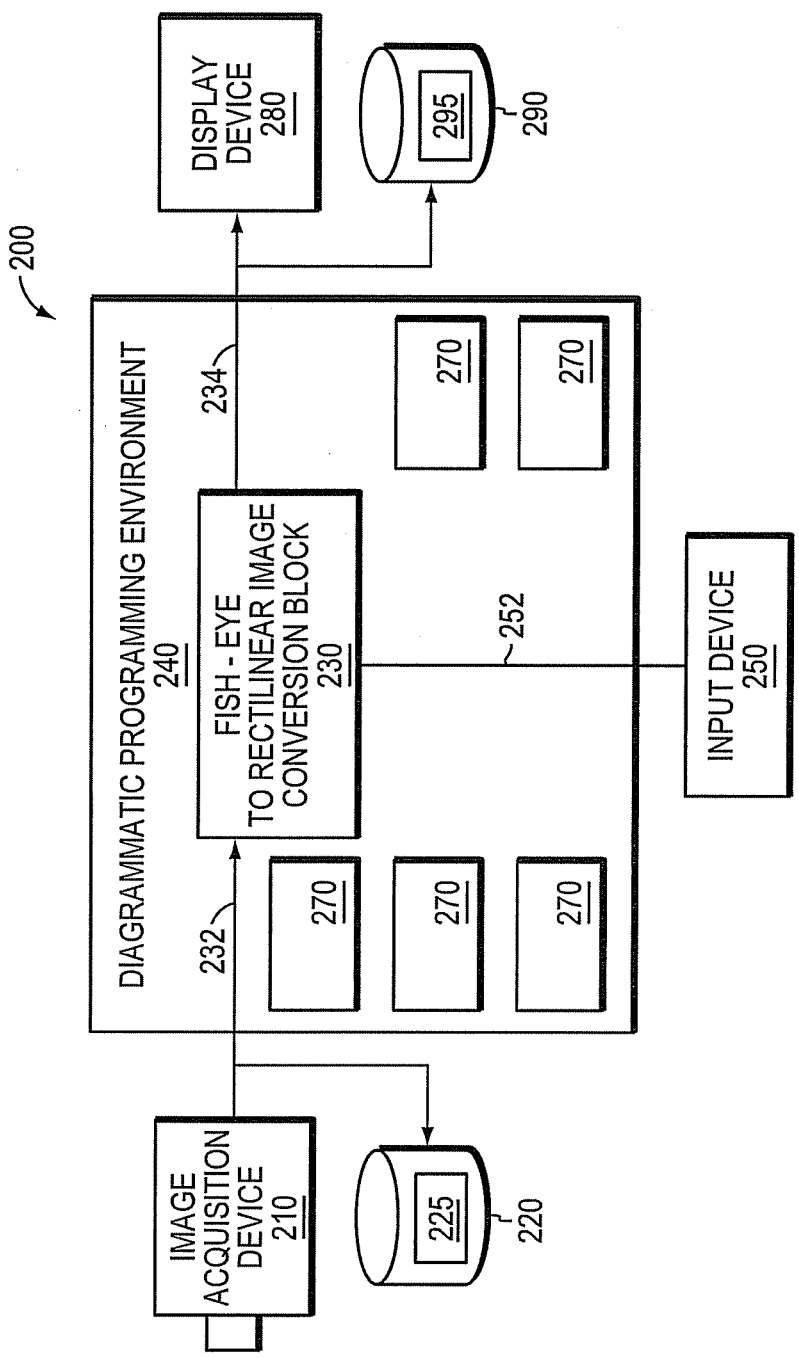
FIG. 2 is a highly stylized schematic diagram showing an illustrative Fish-Eye (or wide-angle) image to rectilinear image conversion block, employed in a block diagram of a diagrammatic programming environment.

FIG. 2 is a highly stylized schematic diagram 200 showing an illustrative Fish-Eye (or wide-angle) to rectilinear image conversion block 230 employed in a block diagram of a diagrammatic programming environment 240. In the interest of brevity, many of the discussions hereinafter are phrased simply in terms of Fish-Eye images and their conversion. Yet, it should be remembered that the structures and techniques described herein are not limited to Fish-Eye images per se, and are equally applicable to other types of wide-angle images, including wide-angle images that encompass a field of view significantly greater or less than a true Fish-Eye image. Accordingly, where the term "Fish-Eye" is used alone in this description, the phrase "or wide-angle" is generally implied.

In FIG. 2, a Fish-Eye image is imported from an image acquisition device 210, such as a digital still camera, a digital video camera, an analog still or video camera whose output is converted to digital form, or another well known type of image sensor. Alternately, the Fish-Eye image may be read from one or more data files 225, stored in a storage medium 220, such as a hard disk, Random Access Memory (RAM) or other type of storage device. Further, the Fish-Eye image may be a "stand-alone" still image, or a part of a stream of images that collectively form a motion video or other type of presentation. Since the operation of the Fish-Eye to rectilinear image conversion block 230 is largely independent of the devices and techniques used to acquire the Fish-Eye image, or the collective nature of several Fish-Eye images, a wide variety of configurations and applications may be supported.

The Fish-Eye image is passed to the Fish-Eye to rectilinear image conversion block 230 in the diagrammatic programming environment 240 by signal 232. In one embodiment, the signal 232 transports the Fish-Eye image as a collection of pixels arranged in a matrix, wherein each cell of the matrix is associated with a particular Red-Green-Blue (RGB) value that describes the corresponding pixel. The RGB values may be represented using any of a variety of well-known data types, for example, double precision floating point, single precision floating point, or fixed point. Alternately, the Fish-Eye image may be encoded according to another of a variety of well-known image formats and image encoding techniques. Such image formats and encoding techniques may include a variety of image compression schemes, and it is expressly contemplated that compression and decompression routines may be performed at various stages of the image conversion process.

Further, while the image conversion block 230 is shown in FIG. 2 to be directly coupled to an image acquisition device 210 or storage medium 220, such that a Fish-Eye image passes directly to the image conversion block 230, in most practical systems, the image first passes through one or more other blocks 270 in the diagrammatic programming environment 240. Accordingly, it should be remembered that the Fish-Eye to rectilinear image conversion block 230 may be used as part of a larger image manipulation system, containing a large number of other blocks 270, which perform a variety of other functions.

In FIG. 2, the Fish-Eye to rectilinear image conversion block 230 is also interconnected by signals 252 to an input device 250. As described in greater detail below, according to one embodiment of the present disclosure, a user may control the region of the Fish-Eye image converted to a rectilinear image by inputting intuitive pan, tilt, and zoom parameters. A pan is generally considered to be a rotation about a vertical axis that is orthogonal to the direction one is looking. Similarly, a tilt is generally considered to be a rotation about a horizontal axis that is orthogonal to the direction one is looking. Further, a zoom is generally considered to be an increase or decrease in the magnification of a portion of an image. A more complex mathematical treatment of these parameters is provided further below, and accordingly, the above description is simply intended to facilitate a high-level understanding of the parameters.

The pan, tilt, and zoom parameters may be specified by the input device 230, which may take on a variety of forms in different embodiments of the present disclosure. For example, in some embodiments the input device may be a general purpose computing device, having a graphical or text-based user interface and peripheral devices such as a mouse and keyboard. Using the peripheral devices, the user may input or otherwise select angles for pan and tilt, as well as select a factor for zoom. In other embodiments, the input device 250 may simply be a controller, such as a joystick or other pointing device, whose movement is interpreted as specifying pan and tilt. Finally, it is contemplated that in some embodiments no input device may be used, and the Fish-Eye to rectilinear image conversion block may simply be pre-set to perform a specific conversion.

Using pan, tilt, and zoom parameters, a user may manipulate a Fish-Eye image to produce a variety of effects. For example, if the image is a single still image, the pan, tilt and zoom parameters may be used to successively view different regions of the image. Alternately, if the image is part of a stream of images forming a video, the parameters may be used to slightly adjust the image, as part of an adjustment over many successive images of the stream, to approximate a moving camera. A wide variety of other effects may be achieved using the capabilities disclosed herein, and accordingly the disclosure should be interpreted to cover these variations.

The Fish-Eye to rectilinear image conversion block 230 is further coupled by signals 234 to a display device 280. The display device may be, for example, a monitor, a general purpose computer, or other type of device that supports display of graphical images. Alternately, the signals 234 may be coupled to a data file 295 in a storage medium 290, such that the rectilinear image may be stored for later viewing or additional processing. Again, the rectilinear image does not necessarily have to pass directly to the display device 280 or storage device 290, but may pass first through one or more other block 270 in the graphical programming environment 240, that perform additional processing upon the image or implement other functions.

Figure 3A:
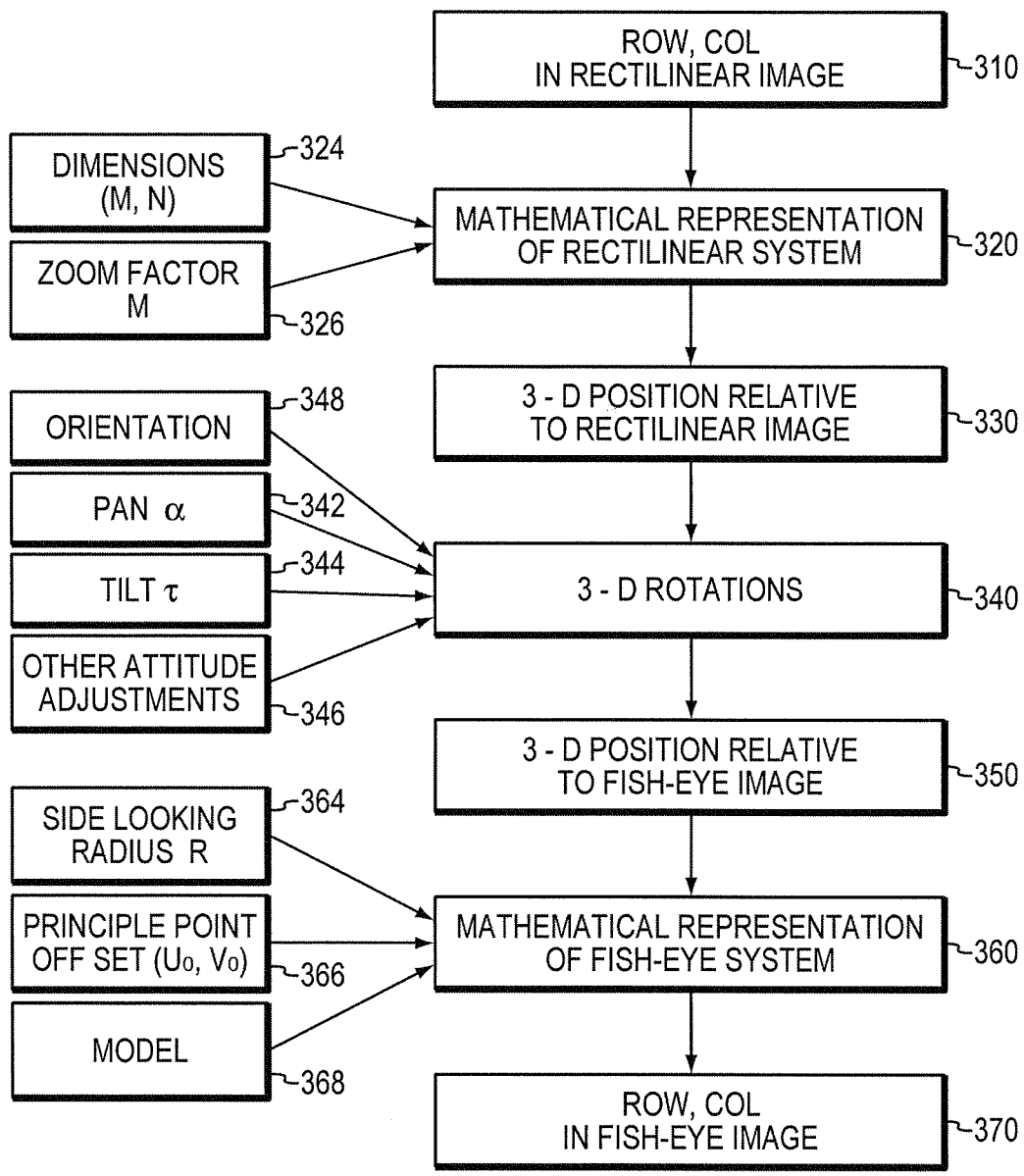
FIG. 3A is a high-level flow diagram of a series of steps for mapping a particular pixel location in a rectilinear image to a pixel location in a Fish-Eye image, according to an illustrative embodiment of the present disclosure.

FIG. 3A is a high-level flow diagram of a series of steps for mapping a particular pixel location in a rectilinear image to a pixel location in a Fish-Eye image, according to an illustrative embodiment of the present disclosure. By repeating this series of steps shown in FIG. 3A for each pixel location in the rectilinear image, the entire rectilinear image may be constructed from the Fish-Eye image. At certain stages in the series of steps, various parameters are required for the conversion process, such as the pan, tilt, and zoom parameters introduced above. While these and other parameters will be discussed at a high-level in relation to FIG. 3A, their exact nature and mathematical underpinnings are reserved for more in-depth discussion in relation to FIGS. 4-7 below.

At step 310, a particular pixel location in the rectilinear image is selected by specification of a row and a column, for example a coordinate (x,y). At step 320, the particular pixel location is translated into a location in a mathematical representation of a rectilinear system. The mathematical representation of the rectilinear system is based upon several parameters, including dimensions of the rectilinear image 324 in pixels, specified by a width M, and a height N (collectively (M,N)), and a zoom factor ($\mu$) 326 that specifies a desired magnification. Then, at step 330, the location of the particular pixel in translated to a 3-D position relative to the rectilinear image.

At step 340, a series of 3-D rotations are performed upon the 3-D position. Such rotations include rotations in response to the pan and tilt parameters 342, 344. In addition, the rotations may also include other "attitude adjustment" rotations 346 to align the Fish-Eye image with horizontal or vertical lines in the environment, prior to the pan and tilt rotations. In some embodiments, the additional attitude adjustment rotations may be specially adapted for approximately horizontal-looking Fish-Eye devices and for approximately vertical-looking Fish-Eye devices, such that they are different depending on the orientation of the devices. Accordingly, an additional orientation parameter 348 is supplied to specify the approximate orientation of the device which captured the Fish-Eye image.

Next, at step 350, the now-rotated 3-D position in relation to the rectilinear image is translated to a 3-D position relative to the Fish-Eye image. At step 360, the 3-D position relative to the Fish-Eye image is converted to a location in the Fish-Eye image, in accord with a mathematical representation of a Fish-Eye system. The mathematical representation of the Fish-Eye system takes several input parameters, including a side-looking radius 364 and a Fish-Eye principal point offset ($u_0$, $v_0$) 366, which, as discussed further below, describe properties of the image acquisition device used to capture the Fish-Eye image. Further, a mathematical model 368 for Fish-Eye systems is provided as a parameter. Using this parameter, the image conversion block may readily implement a variety of well known mathematical models for Fish-Eye systems. Finally, at step 370, the mathematical representation of the Fish-Eye system is used to complete the map of the pixel location (x,y) in the rectilinear image to a particular pixel location (u,v) in the Fish-Eye image.

Using the map, the attributes (for example, color) of a pixel, or several nearby pixels, at the location in the Fish-Eye image are used to set attributes of a pixel in the rectilinear image. It is contemplated that the pixel location in the rectilinear image may not map precisely to a single pixel in the Fish-Eye image. Accordingly, several pixels located proximate to the determined location (u,v) in the Fish-Eye image may be used to interpolate a value for use in the rectilinear image. Such interpolation may be performed according to one of several well know interpolation techniques, such as: nearest neighbor interpolation, where a value of the nearest pixel is used; bilinear interpolation, where a weighted average of four pixels that are part of both the two nearest rows and two nearest columns is used; or bicubic interpolation, where a weighted average of sixteen pixels that are part of the four nearest rows and four nearest columns is used.

Looking to the parameters that are discussed above in relation to FIG. 3A, it is apparent that some parameters will often be specified for each image, while other parameters may be uniform across many images produced by a particular fixed image acquisition device, while still other parameters may be chosen once for many devices. For example, in most cases it is desirable to specify particular pan, tilt, and zoom parameters for each rectilinear image constructed (though, a limited system is expressly contemplated that lacks this capability and where these parameters are pre-set). Other parameters, for example orientation, attitude adjustment, side-looking radius, and Fish-Eye principal point offset, may be the same for all images acquired by a particular image acquisition device, as long as it is in a fixed orientation. Still other parameters, such as the mathematical model for the Fish-Eye system, may be chosen once for all systems, if a user so desires.

Figure 3B:
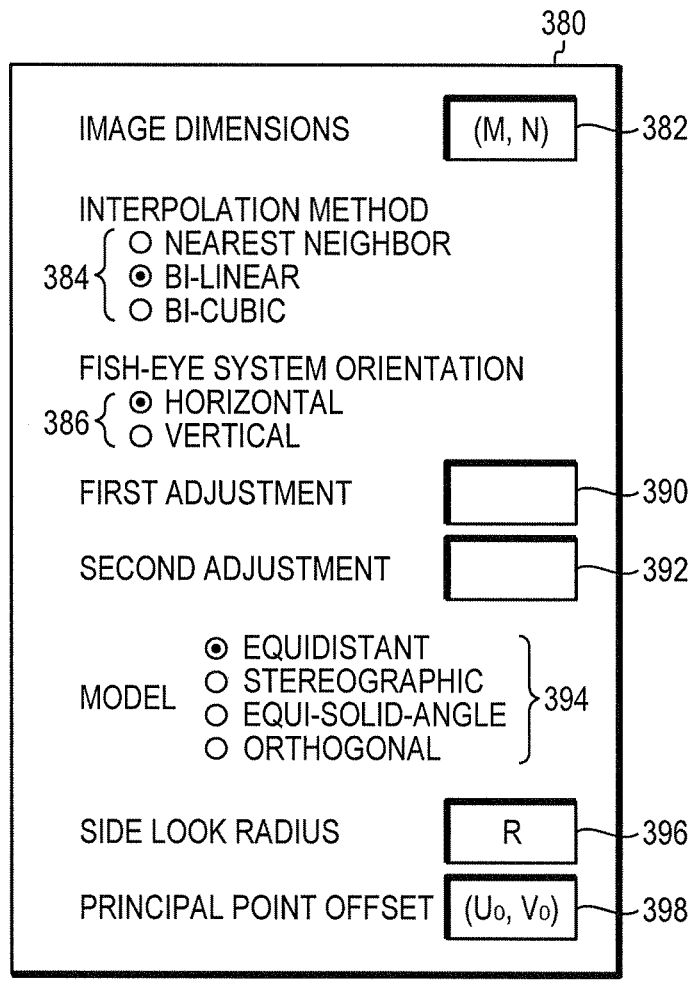
FIG. 3B is a schematic diagram of one possible user interface for the illustrative Fish-Eye to rectilinear image conversion block.

FIG. 3B is a schematic diagram of one possible user interface 380 for the Fish-Eye to rectilinear image conversion block 230, which illustrates how a user may set several of the above discussed parameters. First, the dimensions (M,N) of the rectilinear image are specified in pixels in a field 382. Next, an interpolation method is selected from several options provided with radio buttons 384 or another type of selectable interface. The approximate orientation of the Fish-Eye image acquisition device is also selected from the options 386, from choices, such as approximately horizontal or approximately vertical. Then, first and second attitude adjustments are provided in fields 390, 392 to correct for deviations from substantially true horizontal and substantially true vertical in the Fish-Eye orientation. In addition, a mathematical model is selected with radio buttons 394, or another selectable interface, for use in the mathematical representation of the Fish-Eye system. Finally, a side-looking radius R and a principal point offset $(u_0,v_0)$ of the Fish-Eye image acquisition device are specified in fields 396, 398, for use in the Fish-Eye mathematical representation.

Figure 3C:
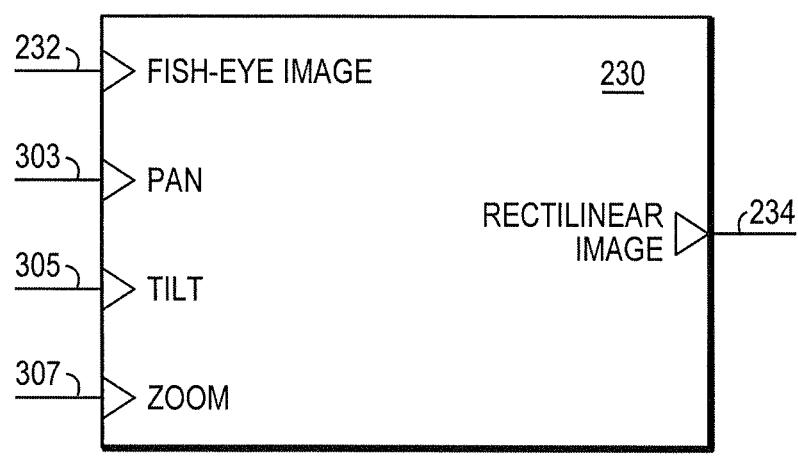
FIG. 3C is an expanded view of an illustrative Fish-Eye (or wide-angle) image to rectilinear image conversion block.

FIG. 3C is an expanded view of an illustrative Fish-Eye (or wide-angle) image to rectilinear image conversion block 230. As described above, a signal 232 transports the Fish-Eye image to the conversion block 230, and the image is accepted on an input data interface. Further, pan, tilt and zoom, signals 303, 305, 307 are accepted on additional input data interfaces. After the conversion process is complete, a rectilinear image is output as a signal 234 from an output data interface.

Now, looking to the conversion of a Fish-eye image to a rectilinear image in more detail, the mathematical computations and transformations underlying the steps of FIG. 3A are discussed in depth.

Figure 4A:
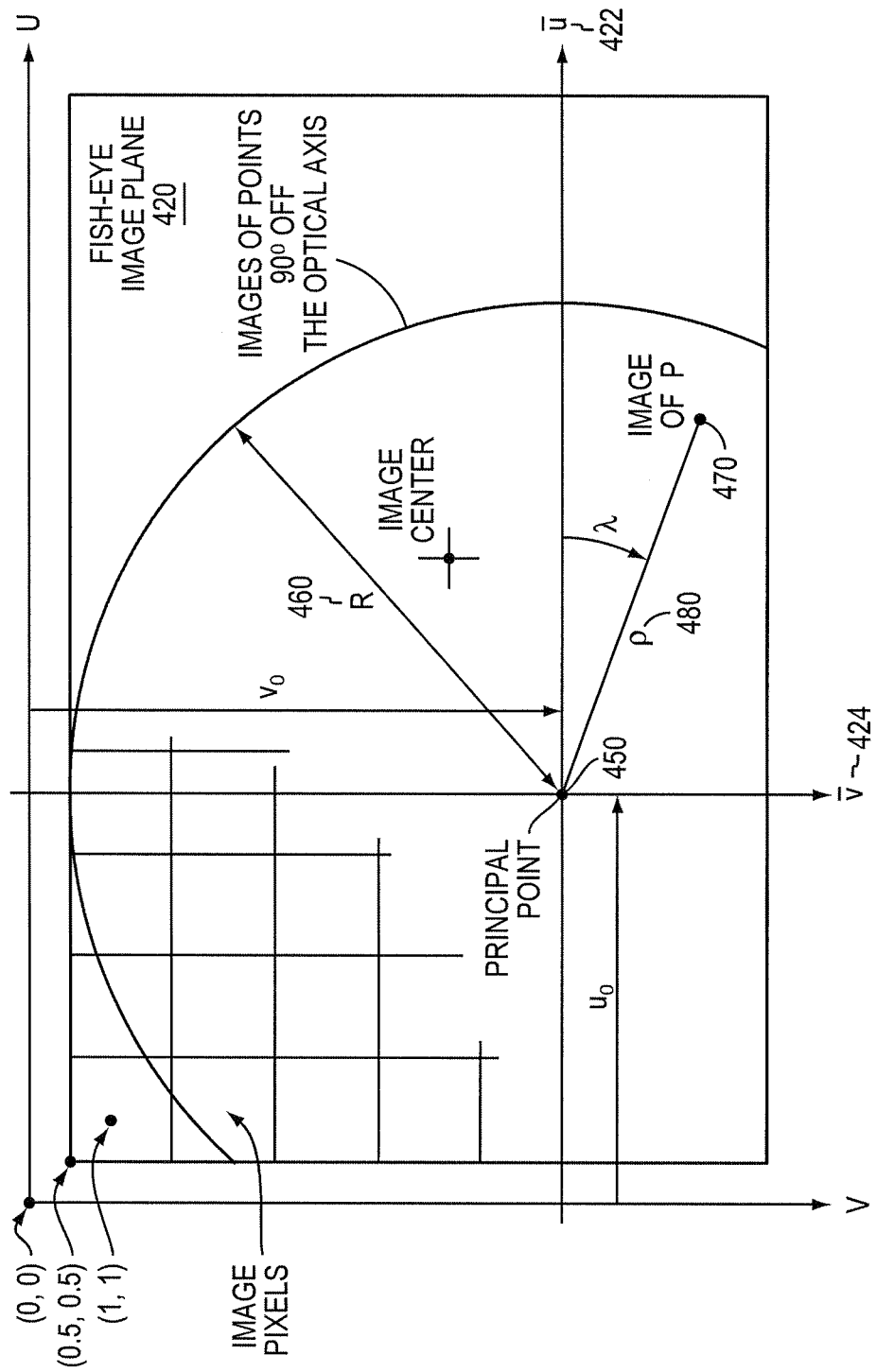
FIG. 4A is a schematic diagram illustrating, in part, a Fish-Eye image plane of a mathematical representation of a Fish-Eye system according to an illustrative embodiment of the present disclosure.
Figure 4B:
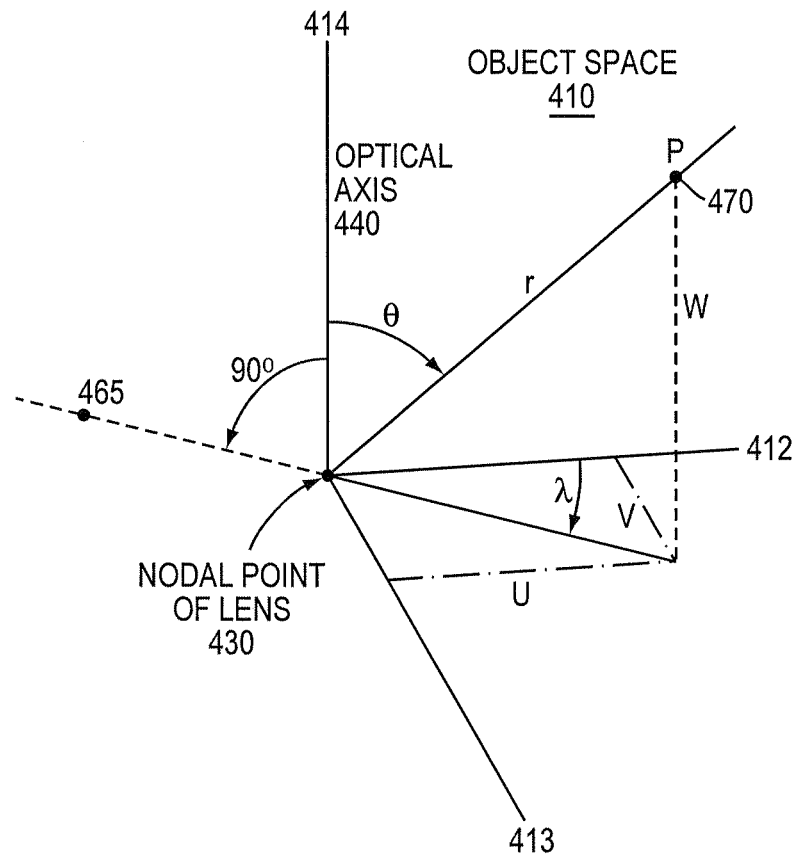
FIG. 4B is a schematic diagram illustrating, in part, an object space of a mathematical representation of a Fish-Eye system according to an illustrative embodiment of the present disclosure.

FIGS. 4A and 4B are schematic diagrams illustrating a mathematical representation of a Fish-Eye system according to an illustrative embodiment of the present disclosure. In FIG. 4A, the Fish-Eye image is represented by a plane 420, called the Fish Eye image plane and defined by the $\bar{u}$-axis 422 and the $\bar{v}$-axis 424, having units of image pixels. Their origin is chosen to be the principal point 450, the location in the image plane of the image of any external feature that falls on the optical axis of the Fish-Eye image acquisition device. The $\bar{u}$-axis 422 is chosen to be parallel to rows of pixels in the image, and the $\bar{v}$-axis 424 is parallel to the columns.

In many systems, the principal point coincides with the center of a captured image or the center of the image acquisition device used to capture the Fish-Eye image. Yet, this is not always the case due to certain irregularities in real-world systems and the fact that an image may be cropped to select a particular region. That is, even if the optical axis coincides with the center of the image at the time of image capture, its offset in terms of rows and columns may change due to cropping of the image to select a region. Accordingly, one may define a principal point offset $(u_0, v_0)$ to specify the location of the principal point in pixels with respect to the column (u) and row (v) coordinates of the image. It should be remembered, though, that when the principal point 450 falls precisely at the center of the pixel grid it suffices to simply know the column and row dimensions of the image.

In FIG. 4B the external physical environment of the Fish-Eye system is represented by a three-dimensional Cartesian space 410, termed the object space. The object space 410 is defined by a first, second, and third axes 412, 413, and 414. Their origin is defined to coincide with the (front) nodal point of the lens 430 of the image acquisition device used to capture the Fish-Eye image. The first two axes 412, 413 are defined to be parallel to the internal rows and columns of the image acquisition device. The third axis 414 is defined to coincide with the optical axis 440.

The mathematical representation of a Fish-Eye system may be fully defined with a limited number of parameters. One parameter useful in defining such a representation is side-looking radius, R, 460 in FIG. 4A which was discussed at a high-level above. In more detail, the side-looking radius is a distance, in pixel units, in the Fish-Eye image plane 420, at which a feature 465 that is 90-degrees from the optical axis 440 will appear in the image plane relative to the principal point 450

Another parameter used to define such a representation, is an indication of a mathematical modal for a Fish Eye system (sometimes termed a geometric class). A variety of known mathematical models for Fish-Eye systems relate an angle θ, between the optical axis 440 and a point 470 in the object space, to a distance ρ 480 measured between the principal point 450 and the image of the point 470 in the Fish-Eye image plane 420. In general the expression, $$\rho = R * F(\theta),$$

may be used, where F is a function embodying a selected mathematical model scaled by an appropriate factor, for example, the equidistant model where $F(\theta)=2\theta/\pi$,
the stereographic model where $F(\theta)=\tan(\theta/2)$,
the equi-solid-angle model where $F(\theta)=\sqrt{2}\sin(\theta/2)$,
the orthogonal model where $F(\theta)=\sin\theta$.

In addition, for even greater precision, F may be specified using a custom polynomial function descriptive of the actual image acquisition device used to capture the Fish-Eye image. Such a polynomial function may consist of a series of odd powers of ρ, scaled appropriately. Generally, though, the extra precision provided by a polynomial model is unnecessary, especially where the result of the Fish-Eye to rectilinear image conversion is to be examined by the unaided human eye. Accordingly, use of a polynomial model may be reserved for specialty applications.

In summary, considering the above described mathematical representation of a Fish-Eye system, it is apparent that the system may be fully described using only three parameters, namely a side-looking radius R, a principal point offset $(u_0, v_0)$ and a geometric class function F.

A position specified according to the mathematical representation of a Fish-Eye system is readily converted to a 3-D position relative to the Fish-Eye image. Such a 3-D position is easier to scale, rotate, and otherwise process. Given that the mathematical representation of the Fish-Eye system is symmetric to rotations about the optical axis, the coordinates of a point (U,V,W) in 3-D Cartesian coordinates is given by the formulas:

$$\bar{u}=\rho \cos \lambda,$$

$$\bar{v}=\rho \sin \lambda,$$

where $\lambda$, $\theta$, and a range r to the point constitute a system of spherical coordinates:

$$\begin{bmatrix} U \\ V \\ W \end{bmatrix} = r \begin{bmatrix} \cos\lambda\sin\theta \\ \sin\lambda\sin\theta \\ \cos\theta \end{bmatrix}$$

The principal point offset $(u_0, v_0)$, in pixels, may be readily applied in the Cartesian coordinate system such that coordinates of a point (u,v) in the Fish-Eye image are represented by the formulas:

$$u=u_0+\bar{u},$$

$$v=v_0+\bar{v},$$

Figure 5A:
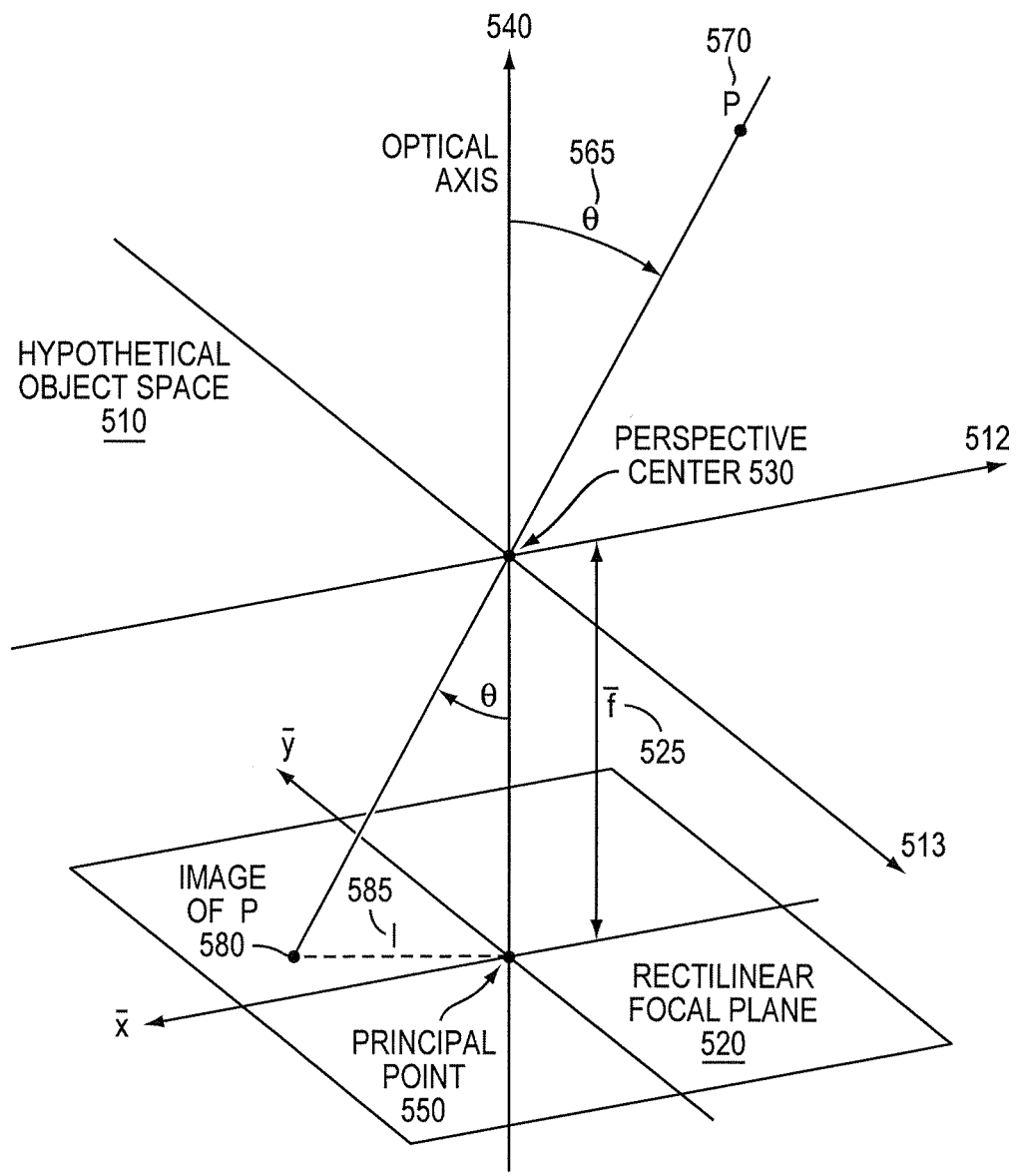
FIG. 5A is a schematic diagram illustrating, in part, an object space of a mathematical representation of a rectilinear system according to an illustrative embodiment of the present disclosure.
Figure 5B:
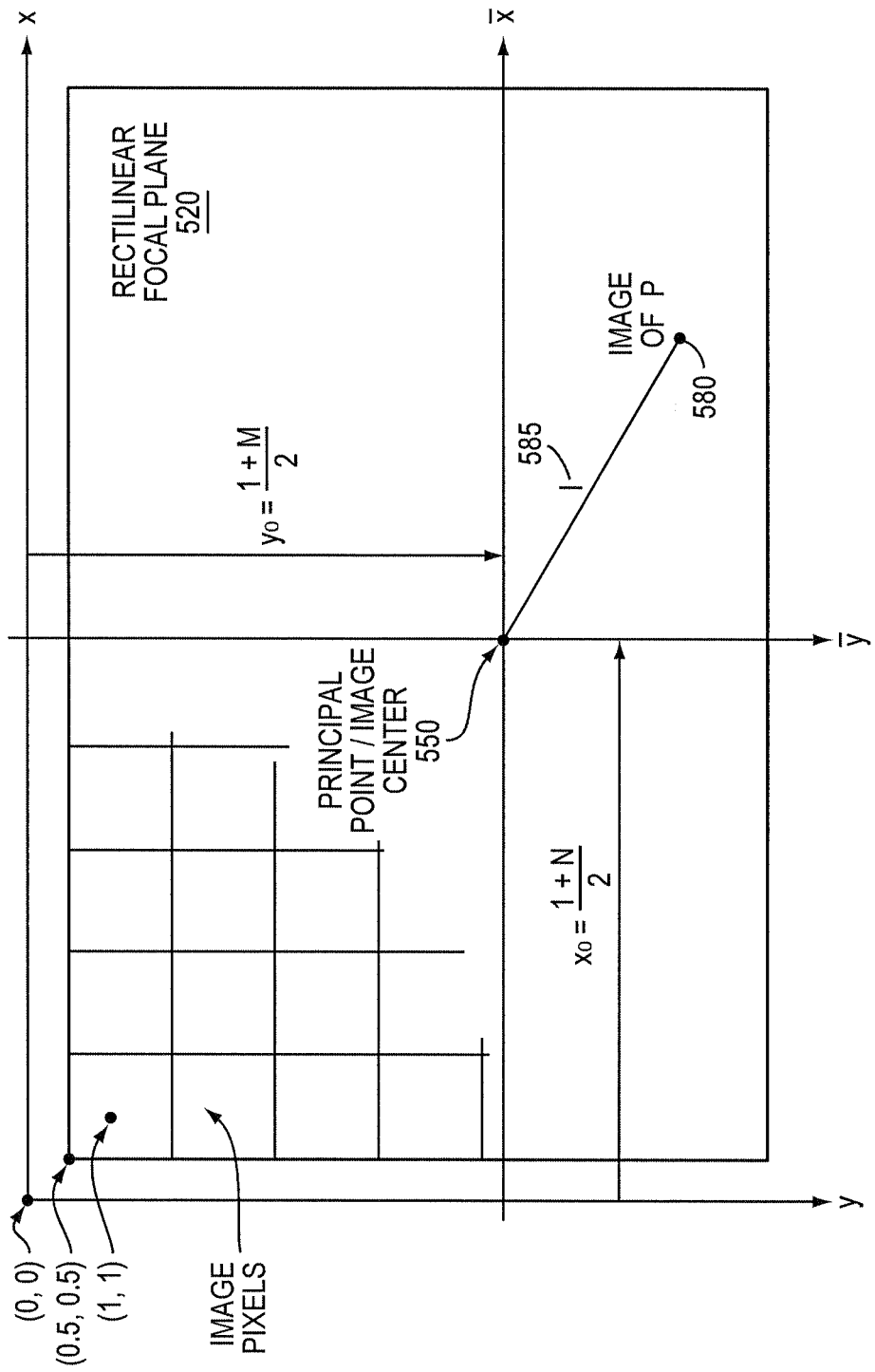
FIG. 5B is a schematic diagram illustrating, in part, a rectilinear focal plane of a mathematical representation of a rectilinear system according to an illustrative embodiment of the present disclosure.

FIGS. 5A and 5B are schematic diagrams illustrating a mathematical representation of a rectilinear system according to an illustrative embodiment of the present disclosure. The rectilinear system model is a purely mathematical construct, and does not correspond to a physical system. Accordingly, certain simplifications may be built into the model to simplify calculations. In FIG. 5A, a hypothetical object space 510 is represented as a three-dimensional Cartesian space defined by three axes 512, 513, 540. A rectilinear focal plane 520 is disposed parallel to two axes 512, 513 of the hypothetical object space 510. The other axis of the hypothetical object space represents the optical axis 540, and passes through a point 530 termed the perspective center, and impacts the focal plane 520 at its principal point 550. The perspective center 530 is located a distance $\bar{f}$ 525 from the focal plane 520.

The distance $\bar{f}$ is an effective focal length, and it, as well as all other lengths in FIG. 5A and FIG. 5B have units of pixel widths. Since the mathematical representation of the rectilinear system may be considered a digital system, with an image composed of discrete pixels, rather than specify the focal plane length $\bar{f}$ in physical units of length, it is simpler to work with an $\bar{f}$ that is defined in terms of pixel widths. When doing so, the width of a pixel does not need to be specified in physical units of length either, since such a scalar would cancel out in other computational steps.

Furthermore, unlike the above described Fish-Eye mathematical representation, the principal point 550 in the mathematical representation of the rectilinear system may be chosen to fall precisely in the center of the focal plane 520. Accordingly, once the row and column dimensions are chosen, additional offset parameters are not needed.

A point 570 in the hypothetical object space 510 may be represented in terms of: first, an angle $\theta$ 565 between a ray extended from the rectilinear focal plane 520 through the perspective center 530 to the point 570, and the optical axis 540; and second, the effective focal length $\bar{f}$ 525 in pixel widths. That is, a distance l 585 in pixel widths from the image of point 580 in the focal plane 520, to the principal point 550, is given by the function:

$$l(\theta)=\bar{f}\tan\theta.$$

Also, the principal point 550 of the focal plane 520 may be represented in terms of the number of pixels in rows (M) and columns (N) in the rectilinear image, since the principal point is located at the center of the focal plane 520. Accordingly, the principal point's location $(x_0, y_0)$ is defined as:

$$x_0=(1+N)/2,$$

$$y_0=(1+M)/2.$$

As discussed above, a 3-D position relative to the rectilinear image may readily be produced from a location in the rectilinear mathematical representation. That is, one may convert to a location (X,Y,Z) in Cartesian coordinates relative to the rectilinear image from a point $(\bar{x},\bar{y},\bar{f})$ in the rectilinear mathematical representation.

Thus, the coordinates $(\bar{x},\bar{y})$ of a point in the focal plane is defined in relation to the principal point of the focal plane 520 such that:

$$\bar{x}=x-x_0,$$

$$\bar{y}=y-y_0.$$

Considering the above description of the mathematical representation of a rectilinear perspective system, the system may be fully specified with two parameters, namely the number of rows and columns (M, N) in the rectilinear image (in pixel units), and the effective focal length $\bar{f}$ (which, as explained further below, may in some embodiments be computed from a zoom factor $\mu$).

It is expressly contemplated that in some embodiments of the present disclosure a user may not be provided an ability to magnify or reduce the size of the portion of the Fish-Eye image converted to a rectilinear image, i.e. to "zoom" in or out of the image. In such limited embodiments, $\bar{f}$ may be directly used as an input parameter.

Yet, in other embodiments, the user is provided the ability to magnify or reduce the features in the created rectilinear image. To support such magnification or reduction, a zoom factor $\mu$ is used as an input parameter, and the zoom factor $\mu$ translated to create a scaled $\bar{f}$. The zoom factor $\mu$ may be in units easily understood by a user, for example in units of factors such as 1×, 2×, 3× etc. The relation between $\mu$ and $\bar{f}$ is dependent on the mathematical model (geometric class) used in the mathematical representation of the Fish Eye System. For example, the following relations may be used for the indicated mathematical models:

for the equidistant model $\bar{f}=2\mu R/\pi$,
for the stereographic model $\bar{f}=\mu R/2$,
for the equi-so lid-angle-model $\bar{f}=\mu R\sqrt{2}/2$,
for the orthogonal model $\bar{f}=\mu R$.

Additional relations may readily be employed with other mathematical models, and accordingly the relation between $\mu$ and $\bar{f}$ in no way limits the types of mathematical models that may be employed with the disclosure.

In order to map a pixel location (x,y) in the rectilinear image to a particular pixel location (u,v) in the Fish-Eye image, the mathematical representation of the rectilinear system, the mathematical representation of the Fish-Eye system, and the relations between the representations and external 3-D positions are employed together. The mapping may be represented in terms of a rotation matrix Q such that:

$$\begin{bmatrix} \overline{U} \\ \overline{V} \\ \overline{W} \end{bmatrix} = Q^{-1} \begin{bmatrix} \bar{x} \\ \bar{y} \\ \bar{f} \end{bmatrix},$$

where $\overline{U}, \overline{V}$, and $\overline{W}$ specify a point in the object space that lies in exactly the same direction as a feature, as seen by the Fish-Eye system. Thus, $\overline{U}$, $\overline{V}$, and $\overline{W}$ are related to the coordinates U, V, W that were introduced above by an unknown scalar multiplier. The value of this scalar may remain unknown as the multiplier drops out in subsequent calculations. Specifically, the multiplier is not present after values for $\lambda$ and $\theta$ in the Fish-Eye mathematical representation are calculated as:

$$\lambda = a\tan 2(\overline{V},\overline{U}) \text{ and,}$$

$$\theta = a\tan 2(\sqrt{\overline{U}^2+\overline{V}^2},\overline{W}),$$

where the function a tan 2 is a well-known mathematical function that calculates the arc tangent of the first argument divided by the second argument taking into account the signs of the arguments to select a proper quadrant. That is, the function a tan 2 yields values in the interval of $-\pi$ to $\pi$ rather than restricting the values to the interval of $-\pi/2$ to $\pi/2$.

An individual mapping may be performed for each pixel location in a rectilinear image, and in this manner a rectilinear image constructed from image data in the Fish-Eye image.

Further, the above described rotation matrix Q comprises a plurality of elementary rotation matrices, each of which performs a particular rotation. For example, as explained in more detail below, separate elementary matrices may be used to implement pan, tilt, and attitude adjustments. The elementary rotation matrices may be, for example, selected from the well known elementary rotation matrices:

$$R_1(\beta) = \begin{bmatrix} 1 & 0 & 0 \\ 0 & -\cos\beta & \sin\beta \\ 0 & -\sin\beta & \cos\beta \end{bmatrix},$$

$$R_2(\beta) = \begin{bmatrix} \cos\beta & 0 & -\sin\beta \\ 0 & 1 & 0 \\ \sin\beta & 0 & \cos\beta \end{bmatrix},$$

and $$R_3(\beta) = \begin{bmatrix} \cos\beta & \sin\beta & 0 \\ -\sin\beta & \cos\beta & 0 \\ 0 & 0 & 1 \end{bmatrix}.$$

In order to allow the pan, tilt, and attitude adjustments to be intuitive to a user, the rotation matrix Q comprises a different set of rotations depending upon whether the image acquisition device that captured the Fish-Eye image was oriented approximately horizontal or approximately vertical. In the below discussion, for simplicity it is assumed that all vertically orientation Fish-Eye image acquisition devices are "down-looking," as opposes to "up-looking". Such an assumption may be used in an actual embodiment of the present disclosure, or alternately, with minor adjustment to the techniques discussed below, provision for "up-looking" Fish-Eye image acquisition devices may be provided. Accordingly, it is expressly contemplated that in an embodiment that supports "up-looking" devices as well as "down-looking" devices, a user may be prompted to enter additional orientation parameters to specify between these two possible orientations.

Looking to a system where the Fish-Eye image has an approximately horizontal orientation, the rotation matrix Q may be defined as:

$$Q=R_1(\tau)R_2(\alpha)R_1(\omega)R_3(\sigma)$$

In this expression, the matrices $R_1(\tau)$ and $R_2(\alpha)$ perform tilt and pan, while the matrices $R_1(\omega)$ and $R_3(\sigma)$ perform attitude adjustments to bring the Fish-Eye system into a substantially true horizontal alignment. One is reminded that a system may be constructed that does not support attitude adjustment, and in such a system matrices $R_1(\omega)$ and $R_3(\sigma)$ are simply not used.

Figure 6A:
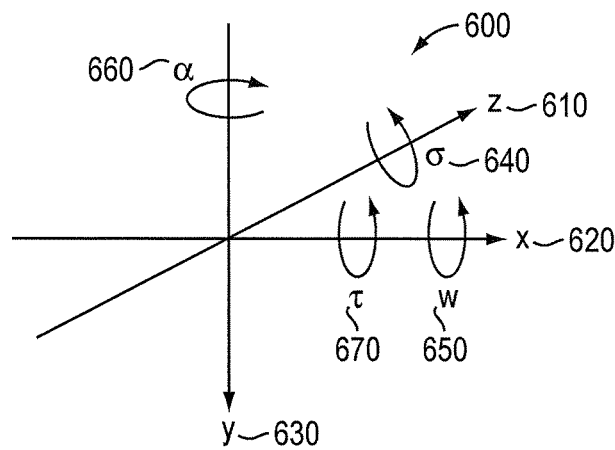
FIG. 6A is a diagram of a coordinate system that illustrates the application of a rotation matrix to perform pan, tilt, and attitude adjustments for an approximately horizontally oriented Fish-Eye system, according to an illustrative embodiment of the present disclosure.

FIG. 6A is a diagram of a coordinate system 600 that illustrates the application of a rotation matrix Q to perform pan, tilt, and attitude adjustments for an approximately horizontally oriented Fish-Eye system, according to an illustrative embodiment of the present disclosure. Suppose the z-axis 610 is oriented along the optical axis of a Fish-Eye system, and the x-axis 620 and the y-axis 630 are oriented in the image plane. Beginning with the rightmost term in the expression for Q, a first attitude adjustment, implemented by rotation matrix $R_3(\sigma)$, performs a rotation 640 of angle $\sigma$ about the z-axis 610. Such a rotation, if needed, is used to adjust the image so that horizontal lines in the image appear as horizontal. In effect, the rotation matrix $R_3(\sigma)$ performs a "swing" about the optical axis, and accordingly the first attitude adjustment may be considered, in a sense, a "swing" adjustment. Next, a second attitude adjustment, implemented by rotation matrix $R_1(\omega)$, if needed, performs a rotation 650 of angle $\omega$ about the x-axis 620. Such a rotation brings the optical axis itself into a horizontal position, in effect performing a "tilt adjustment," pre-leveling the image up or down prior to further application of a tilt parameter.

After the initial attitude adjustments, if employed, the system is considered to be calibrated to a particular starting attitude. Then, selected pan and tilt parameters may be applied to select a particular portion of the Fish-Eye image to convert to a rectilinear image. In response to an indication of a particular pan angle $\alpha$, a rotation 660 about the vertical y-axis 630 is performed by rotation matrix $R_2(\alpha)$. Finally, in response to an indication of a particular tilt angle $\tau$, which specifies a tilt up or down from horizontal, another rotation 670 is performed about the x-axis 620, this time by rotation matrix $R_1(\tau)$.

Figure 6B:
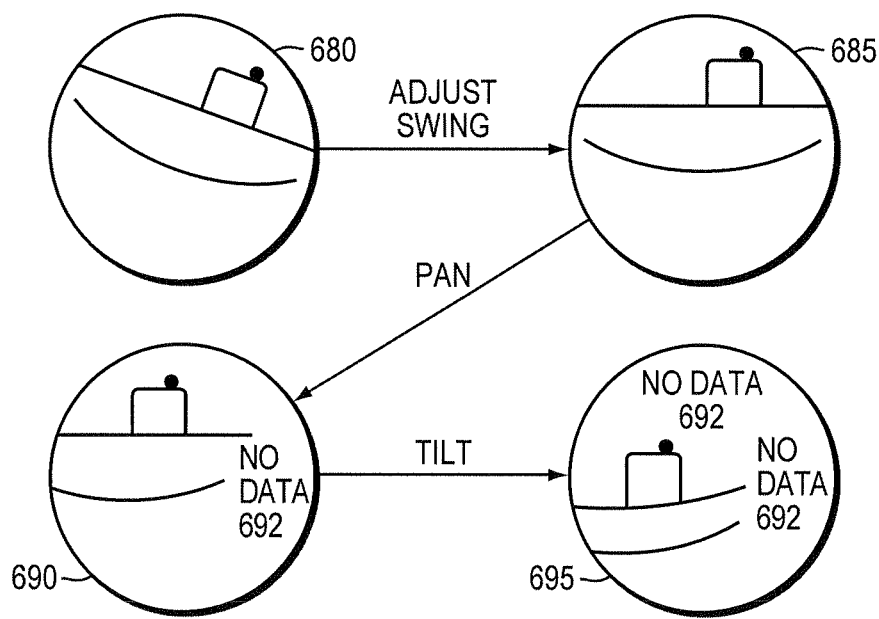
FIG. 6B is an example of application of the rotation techniques described in relation to FIG. 6A on an illustrative image.

FIG. 6B is an example of an application of the rotation techniques described in relation to FIG. 6A on an illustrative image. Suppose that a portion of an illustrative Fish-Eye image 680, captured with a horizontally oriented image acquisition device, is to be converted to a rectilinear image. The illustrative Fish-Eye image 680 may first be adjusted by a "swing" adjustment, using rotation matrix $R_3(\sigma)$, that rotates the image about the optical axis so that horizontal lines in the image appear as horizontal, as shown in image 685. Note, in this example, there is no need to level the image up or down, so a "tilt adjustment" by a rotation matrix $R_1(\omega)$ is not used. Next, a particular pan is applied by rotation matrix $R_2(\alpha)$, to rotate about the vertical axis, to a region of interest in the Fish-Eye image, as shown in image 690. As the Fish-Eye image has a particular field of view, if an attempt is made to pan beyond the field of view, no image data will be available, as shown by "no data" regions 692. Finally, a particular tilt is applied by rotation matrix $R_1(\tau)$ to produce a final image 695 of a desired region. In this manner, the successive application of rotation matrices is used to select a region, using input parameters that are intuitive to a user.

Similar to the above described approximately horizontal Fish-Eye system, rotations may be defined for an approximately vertical system. Looking to a system where a Fish-Eye image has an approximately vertical (in this case "down looking") orientation, the rotation matrix Q may be defined as:

$$Q=R_1(\tau)R_3(\alpha)R_2(\phi)R_1(\omega).$$

In this expression, the matrices $R_1(\tau)$ and $R_3(\alpha)$ perform tilt and pan, while the matrices $R_2(\phi)$ and $R_1(\omega)$ perform attitude adjustments to adjust the Fish-Eye system into substantially true vertical alignment. One is reminded that a system may be constructed that does not support attitude adjustment, and, in such a system, matrices $R_2(\phi)$ and $R_1(\omega)$ are simply not used.

Figure 7A:
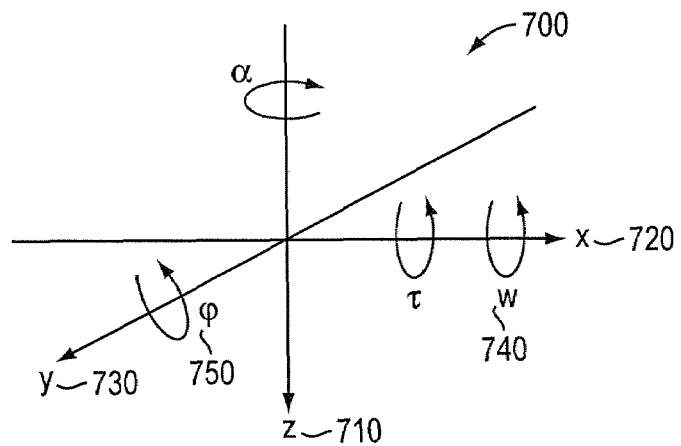
FIG. 7A is a diagram of a coordinate system that illustrates the application of a rotation matrix to perform pan, tilt, and attitude adjustments for an approximately vertically oriented Fish-Eye system, according to an illustrative embodiment of the present disclosure.

FIG. 7A is a diagram of a coordinate system 700 that illustrates the application of a rotation matrix Q to perform pan, tilt, and attitude adjustments for an approximately vertically oriented Fish-Eye system, according to an illustrative embodiment of the present disclosure. Suppose the z-axis 710 is oriented along the optical axis of a Fish-Eye system, and the x-axis 720 and the y-axis 730 are oriented in the image plane. Beginning with the rightmost term in the expression for Q, a first attitude adjustment, implemented by matrix $R_1(\omega)$, performs a rotation 740 of angle ω about the x-axis 720. Such a rotation is used to "level" the image by aligning the optical axis of the system to nadir, i.e. directly downward, in a first plane of rotation. Next, a second attitude adjustment $R_2(\phi)$, if needed, performs a rotation 750 of angle φ about the y-axis 730, to align the optical axis of the system to nadir, in a second plane of rotation After the initial attitude adjustments, if employed, the system is considered to be calibrated to a particular starting attitude. Then, selected pan and tilt parameters may be applied to select a particular portion of the Fish-Eye image that is converted to rectilinear image. In response to an indication of a particular pan angle α, a rotation 760 about the vertical z-axis 710 is performed by rotation matrix $R_3(\alpha)$. Finally, in response to an indication of a particular tilt angle r, specifying a tilt up or down, another rotation 770 is performed about the x-axis 720, this time by rotation matrix $R_1(\tau)$.

Figure 7B:
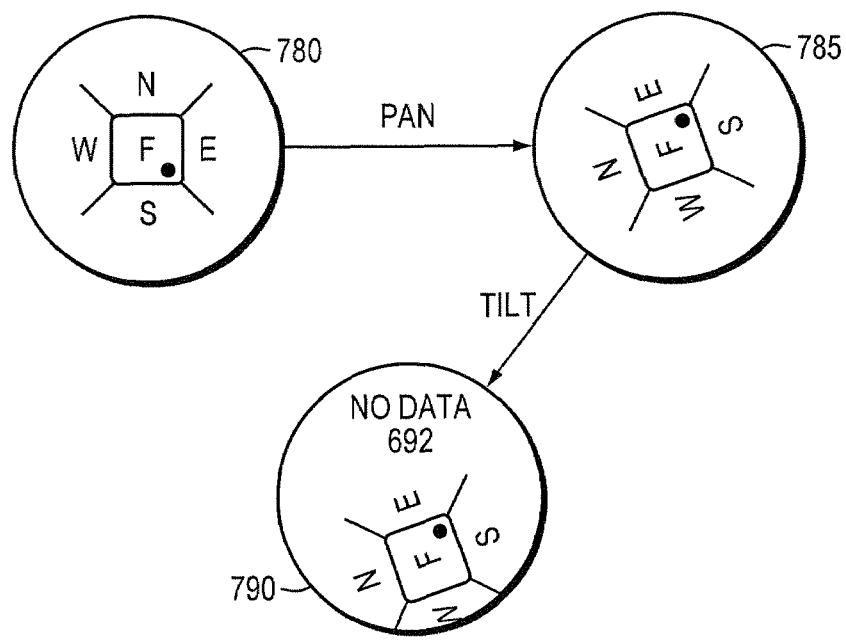
FIG. 7B is an example of application of the rotation techniques described in relation to FIG. 7A on an illustrative image.

FIG. 7B is an example of application of the rotation technique described in relation to FIG. 7A on an illustrative image. Suppose that a portion of an illustrative Fish-Eye image 780, captured with a vertically oriented image acquisition device, is to be converted to a rectilinear image. In this example, there is no need to level the image, so attitude adjustment matrixes $R_2(\phi)$ and $R_1(\omega)$ are not employed. The illustrative Fish-Eye image 780 may first be subject to a particular pan by rotation matrix $R_3(\alpha)$, to rotate the image about the vertical, illustrated by image 685. Then, a particular tilt is applied by rotation matrix $R_1(\tau)$, to move up or down in the image to a desired region, illustrated by image 790. As discussed above, if an attempt is made to tilt beyond the field of view, no image data will be available, illustrated by "no data" regions 792. In this manner, the successive application of rotation matrices is used to select a region, using input parameters that are intuitive to a user.

The above described techniques for converting a portion of a Fish-Eye or other wide-angle image into a rectilinear image may be used in a variety of applications. For example, the techniques may be used in an automotive application to convert a wide-angle image captured by a camera mounted on a vehicle to a rectilinear image displayed to an occupant of the vehicle, such as the driver. In an example configuration, a block diagram including the above described Fish-Eye to rectilinear image conversion block is translated to executable code for use with a general purpose processor and stored in a memory device in the vehicle, or alternately is translated to hardware specific code and programmed into an embedded hardware device in the vehicle. The processor or embedded hardware device is coupled to, for example, a backwards directed wide-angle camera configured for rear-view backup monitoring. The processor or embedded hardware device is also coupled to a display screen inside the vehicle. The driver or other user may select with an input device, such as a joystick, button pad, or touch-screen, mounted inside the vehicle, pan and tilt parameters. These parameters are then used in accord with the above-described techniques to generate the appropriate rectilinear image for display to the user. The user may freely adjust the pan and tilt parameters with the input device, for example to pan down to see the bumper of a nearby vehicle, or to pan up to see more distant objects. In such a manner, the system provides the functionality of a "moving" camera with a fixed wide-angle camera.

Alternately, pan and tilt parameters may be preprogrammed. In such a preprogrammed configuration, the parameters may be selected during the vehicle manufacturing process. Design changes to the field of view displayed to the driver may be made simply with selecting different pan and tilt parameters, without changing the physical mounting of the camera on the vehicle.

Further, the above-described techniques may be used in a variety of other applications, such as video surveillance applications where wide-angle cameras are mounted in spaces to be monitored, conduit-inspection applications where wide-angle cameras are mounted on sleds inserted into conduit, aerial-photography applications where wide angle cameras are mounted to aircraft, as well as other useful applications.

The foregoing has been a detailed description of several embodiments of the present disclosure. Further modifications and additions may be made without departing from the disclosure's intended spirit and scope. It is expressly contemplated that any or all of the processes and data structures described above can be implemented in hardware, software or a combination thereof. A software implementation may comprise a computer-readable medium containing executable program instructions for execution on a computer. A computer may be considered any of a variety of well-known computing devices, including single processing unit systems, multiple processing units systems, stand alone processors, networks of processors, programmable logic circuits, specially-designed hardware chips, analog or partially-analog devices, optical computing devices, or any combination thereof. It should be remembered that the above descriptions are meant to be taken only by way of example, and not to otherwise limit the scope of this disclosure.

What is claimed is:

1. A method for converting a region of a wide-angle image into a rectilinear image, the method comprising:
   converting, by a first processor coupled to a memory storing at least a portion of the region of a wide-angle image, a location of a pixel in the rectilinear image into a 3-D position relative to the rectilinear image;
   in response to a pan parameter, applying, by the first or a second processor, a first rotation matrix to the 3-D position;
   in response to a tilt parameter, applying, by the first, second or a third processor, a second rotation matrix to the 3-D position;
   mapping the 3-D position to a location of one or more pixels in the wide-angle image; and
   setting attributes of the pixel in the rectilinear image using attributes of the one or more pixels in the wide angle image.

2. The method of claim 1, wherein the wide-angle image is a Fish-Eye image.

3. The method of claim 2, in which mapping the 3-D position is performed using a model of a wide-angle system selected from the group consisting of an equidistant model, a stereographic model, an equi-solid angle model, and an orthogonal model.

4. The method of claim 1, further comprising:
   in response to an indication that an image acquisition device that captured the wide-angle image was oriented approximately horizontal, the first rotation matrix performing a rotation about a first axis orthogonal to an optical axis of the image acquisition device.

5. The method of claim 4, further comprising:
the second rotation matrix performing a rotation about a second axis that is orthogonal to the optical axis of the image acquisition device, and that is also orthogonal to the first axis.

6. The method of claim 1, further comprising:
in response to an indication that an image acquisition device that captured the wide-angle image was oriented approximately vertical down-looking, the first rotation matrix performing a rotation about an optical axis of the image acquisition device.

7. The method of claim 6, further comprising:
the second rotation matrix performing a rotation about an axis orthogonal to the optical axis of the image acquisition device.

8. The method of claim 1, further comprising:
in response to a first adjustment parameter, applying a third rotation matrix to the 3-D position to rotate in a first direction prior to the application of the first and second rotation matrices; and
in response to a second adjustment parameter, applying a fourth rotation matrix to the 3-D position to rotate in a second direction prior to the application of the first and second rotation matrices.

9. The method of claim 8, further comprising:
in response to an indication that an image acquisition device that captured the wide-angle image was oriented approximately horizontal, the third and fourth fort-rotation matrices aligning the 3-D position in accord with approximately true horizontal.

10. The method of claim 9, wherein the third rotation matrix performs a rotation about an optical axis of the image acquisition device.

11. The method of claim 10, wherein the fourth rotation matrix performs a rotation about an axis orthogonal to the optical axis of the image acquisition device.

12. The method of claim 8, further comprising:
in response to an indication that an image acquisition device that captured the wide-angle image was oriented approximately down-looking vertical, the first and second rotation matrices aligning the 3-D position in accord with approximately true down-looking vertical.

13. The method of claim 12, wherein the third rotation matrix performs a rotation about a first axis that is orthogonal to an optical axis of the image acquisition device.

14. The method of claim 13, wherein the fourth rotation matrix performs a rotation about a second axis that is orthogonal to an optical axis of the image acquisition device, and that is also orthogonal to the first axis.

15. The method of claim 1, further comprising:
specifying, by a user, the pan and tilt parameters by manipulating an input device.

16. The method of claim 15, wherein the input device is a joystick.

17. The method of claim 1, wherein the method is implemented by a graphical image conversion component within a diagrammatic programming environment.

18. The method of claim 1, wherein the method is implemented by functionality of a text-based programming environment.

19. The method of claim 1, wherein the method is implemented by an embedded hardware target.

20. An apparatus for converting a region of a wide-angle image into a rectilinear image, the apparatus comprising:
an image acquisition device configured to obtain the wide-angle image;
a computer-implemented representation of a rectilinear system configured to convert a location of a pixel in the rectilinear image into a 3-D position relative to the rectilinear image;
a first rotation matrix configured to rotate the 3-D position in response to a pan parameter;
a second rotation matrix configured to rotate the 3-D position in response to a tilt parameter;
a computer-implemented representation of a wide-angle system configured to map the 3-D position to a location of one or more pixels in the wide-angle image and set attributes of the pixel in the rectilinear image using attributes of the one or more pixels in the wide angle image; and
a display device configured to display the rectilinear image.

21. The apparatus of claim 20, wherein the wide-angle image is a Fish-Eye image.

22. The apparatus of claim 21, wherein the computer-implemented representation of a wide-angle system includes a model of a wide-angle system selected from the group consisting of an equidistant model, a stereographic model, an equi-solid angle model, and an orthogonal model.

23. The apparatus of claim 20, wherein the first rotation matrix is further configured to, in response to an indication that an image acquisition device that captured the wide-angle image was oriented approximately horizontal, perform a rotation about a first axis orthogonal to an optical axis of the image acquisition device.

24. The apparatus of claim 23, wherein the second rotation matrix is further configured to perform a rotation about a second axis that is orthogonal to the optical axis of the image acquisition device, and that is also orthogonal to the first axis.

25. The apparatus of claim 20, wherein the first rotation matrix is further configured to, in response to an indication that an image acquisition device that captured the wide-angle image was oriented approximately vertical down-looking, perform a rotation about an optical axis of an image acquisition device.

26. The apparatus of claim 25, wherein the second rotation matrix is further configured to perform a rotation about an axis orthogonal to the optical axis of the image acquisition device.

27. The apparatus of claim 20, further comprising:
a third rotation matrix configured to rotate the 3-D position in a first direction; and
a fourth rotation matrix configured to rotate the 3-D position in a second direction.

28. The apparatus of claim 27, wherein the third and fourth rotation matrices are configured to align the 3-D position in accord with approximately true horizontal in response to an indication that an image acquisition device that captured the wide-angle image was oriented approximately horizontal.

29. The apparatus of claim 27, wherein the third and fourth rotation matrices are configured to align the 3-D position in accord with approximately true down-looking vertical, in response to an indication that an image acquisition device that captured the wide-angle image was oriented approximately down-looking vertical.

30. The apparatus of claim 20 further comprising:
an input device configured to specify the pan and tilt parameters in response to manipulation by a user.

31. The apparatus of claim 30, wherein the input device is a joystick.

32. The apparatus of claim 30, wherein the computer-implemented representation of a rectilinear system and the computer-implemented representation of a wide-angle system are implemented by a graphical image conversion component within a diagrammatic programming environment.

33. The apparatus of claim 30, wherein the computer-implemented representation of a rectilinear system and the computer-implemented representation of a wide-angle system are implemented by functionality of a text-based programming environment.

34. The apparatus of claim 30, wherein the computer-implemented representation of a rectilinear system and the computer-implemented representation of a wide-angle system are implemented by an embedded hardware target.

35. A non-transitory computer readable medium containing executable program instructions for converting a region of a wide-angle image into a rectilinear image, the executable program instructions comprising program instructions configured to:
   convert a location of a pixel in the rectilinear image into a 3-D position relative to the rectilinear image;
   in response to a pan parameter, apply a first rotation matrix to the 3-D position;
   in response to a tilt parameter, apply a second rotation matrix to the 3-D position;
   map the 3-D position to a location of one or more pixels in the wide-angle image; and
   set attributes of the pixel in the rectilinear image using attributes of the one or more pixels in the wide angle image.

36. The non-transitory computer readable medium of claim 35, wherein the wide-angle image is a Fish-Eye image.

37. The non-transitory computer readable medium of claim 36, in which mapping the 3-D position is performed using a model of a wide-angle system selected from the group consisting of an equidistant model, a stereographic model, an equi-solid angle model, and an orthogonal model.

38. The non-transitory computer readable medium of claim 35, further comprising:
   in response to an indication that an image acquisition device that captured the wide-angle image was oriented approximately horizontal, the first rotation matrix performing a rotation about a first axis orthogonal to an optical axis of the image acquisition device.

39. The non-transitory computer readable medium of claim 38, further comprising:
   the second rotation matrix performing a rotation about a second axis that is orthogonal to the optical axis of the image acquisition device, and that is also orthogonal to the first axis.

40. The non-transitory computer readable medium of claim 35, further comprising:
   in response to an indication that an image acquisition device that captured the wide-angle image was oriented approximately vertical down-looking, the first rotation matrix performing a rotation about an optical axis of the image acquisition device.

41. The non-transitory computer readable medium of claim 40, further comprising:
   the second rotation matrix performing a rotation about an axis orthogonal to the optical axis of the image acquisition device.

42. The non-transitory computer readable medium of claim 35, further comprising:
   in response to a first adjustment parameter, applying a third rotation matrix to the 3-D position to rotate in a first direction prior to the application of the first and second rotation matrices; and
   in response to a second adjustment parameter, applying a fourth rotation matrix to the 3-D position to rotate in a second direction prior to the application of the first and second rotation matrices.

43. The non-transitory computer readable medium of claim 42, further comprising:
   in response to an indication that an image acquisition device that captured the wide-angle image was oriented approximately horizontal, the third and fourth rotation matrices aligning the 3-D position in accord with approximately true horizontal.

44. The non-transitory computer readable medium of claim 43, wherein the third rotation matrix performs a rotation about an optical axis of the image acquisition device.

45. The non-transitory computer readable medium of claim 44, wherein the fourth rotation matrix performs a rotation about an axis orthogonal to the optical axis of the image acquisition device.

46. The non-transitory computer readable medium of claim 42, further comprising:
   in response to an indication that an image acquisition device that captured the wide-angle image was oriented approximately down-looking vertical, the first and second rotation matrices aligning the 3-D position in accord with approximately true down-looking vertical.

47. The non-transitory computer readable medium of claim 46, wherein the third rotation matrix performs a rotation about a first axis that is orthogonal to an optical axis of the image acquisition device.

48. The non-transitory computer readable medium of claim 47, wherein the fourth rotation matrix performs a rotation about a second axis that is orthogonal to an optical axis of the image acquisition device, and that is also orthogonal to the first axis.

49. The non-transitory computer readable medium of claim 35, further comprising:
   specifying, by a user, the pan and tilt parameters by manipulating an input device.

50. The non-transitory computer readable medium of claim 49, wherein the input device is a joystick.

51. The non-transitory computer readable medium of claim 35, wherein the executable program instructions are implemented by a graphical image conversion component within a diagrammatic programming environment.

52. The non-transitory computer readable medium of claim 35, wherein the executable program instructions are implemented by functionality of a text-based programming environment.

53. The non-transitory computer readable medium of claim 35, wherein the executable program instructions are implemented by an embedded hardware target.

54. An apparatus for converting a wide-angle image into a rectilinear image, the apparatus comprising:
   a wide angle camera mounted to a vehicle and configured to capture a wide angle image;
   a display device internal to the vehicle configured to display a rectilinear image; and
   a processor configured to map, using a mathematical representation of a rectilinear system and a mathematical representation of a wide angle system, a location of each pixel in the rectilinear image to a location of one or more pixels in the wide-angle image, set attributes of each pixel in the rectilinear image from the one or more pixels in the wide angle image, and convert the location of each pixel to a 3-D position relative to the rectilinear image.

55. The apparatus of claim 54 wherein the processor is further configured to apply a first rotation matrix to rotate the 3-D position in response to a pan parameter, apply a second rotation matrix to rotate the 3-D position in response to a tilt parameter, and map the 3-D position to the one or more pixels in the wide-angle image.

56. The apparatus of claim 55 further comprising:
an input device internal to the vehicle configured to specify the pan and tilt parameters in response to manipulation by a user.

* * * * *